US007371166B1

(12) United States Patent
Webb et al.

(10) Patent No.: US 7,371,166 B1
(45) Date of Patent: May 13, 2008

(54) GAMING DEVICE HAVING A MULTI-ROUND BONUS SCHEME WHEREIN EACH ROUND HAS A PROBABILITY OF SUCCESS

(75) Inventors: Bayard S. Webb, Sparks, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 350 days.

(21) Appl. No.: 09/688,441

(22) Filed: Oct. 16, 2000

(51) Int. Cl.
*A63F 13/00* (2006.01)

(52) U.S. Cl. ............................ 463/12; 463/20; 463/21; 463/25; 273/269

(58) Field of Classification Search ............ 463/16-20, 463/25, 30, 31, 12; 273/138.1, 138.2, 139, 273/143 R, 269, 273; 283/903
See application file for complete search history.

(56) References Cited

U.S. PATENT DOCUMENTS 4,695,053 A 9/1987 Vazquez, Jr. et al.
5,085,436 A * 2/1992 Bennett ........................ 463/21
5,342,047 A 8/1994 Heidel et al.
5,542,669 A 8/1996 Charron et al.
5,647,798 A * 7/1997 Falciglia ...................... 463/19
5,775,692 A * 7/1998 Watts et al. ............ 273/143 R
5,833,537 A * 11/1998 Barrie .......................... 463/21
5,855,514 A * 1/1999 Kamille ....................... 463/17
5,873,781 A 2/1999 Keane
5,902,184 A 5/1999 Bennett et al.
5,967,894 A 10/1999 Kinoshita et al.
5,980,384 A 11/1999 Barrie
5,984,781 A 11/1999 Sunaga
6,015,346 A * 1/2000 Bennett ........................ 463/20
6,033,307 A 3/2000 Vancura (Continued)

FOREIGN PATENT DOCUMENTS

EP 0874337 A1 10/1998

(Continued)

OTHER PUBLICATIONS

Top Dollar Brochure published by IGT in 1998.

(Continued)

*Primary Examiner*—Robert E. Pezzuto
*Assistant Examiner*—William H McCulloch
(74) *Attorney, Agent, or Firm*—Bell, Boyd & Lloyd LLP

(57) ABSTRACT

The present invention provides a gaming device, and more particularly a gaming device having a multi-round bonus scheme wherein each round has a probability of success. In one embodiment, the game maintains and displays a group of symbols, each symbol having an associated selector with which a player can select the symbol. The game also maintains and associates an item with the group, whereby the game can associate a variable quantity of the item with one or more of the symbols of the group. The player preferably chooses one selector and thus one symbol from each group of symbols. If the chosen symbol has an associated item, the game awards the player with a prize. If the player chooses a symbol unassociated with an item, the game does not award the player with a prize. Each round provides a group of symbols with different probabilities of the association of items to symbols.

29 Claims, 8 Drawing Sheets

U.S. PATENT DOCUMENTS

| | | | | |
|---|---|---|---|---|
| 6,056,642 | A * | 5/2000 | Bennett | 463/20 |
| 6,059,289 | A | 5/2000 | Vancura | |
| 6,089,976 | A * | 7/2000 | Schneider et al. | 463/16 |
| 6,089,977 | A * | 7/2000 | Bennett | 463/20 |
| 6,093,102 | A * | 7/2000 | Bennett | 463/20 |
| 6,102,798 | A | 8/2000 | Bennett | |
| 6,126,541 | A | 10/2000 | Fuchs | |
| 6,126,542 | A | 10/2000 | Fier | |
| 6,149,156 | A | 11/2000 | Feola | |
| 6,159,096 | A | 12/2000 | Yoseloff | |
| 6,159,097 | A | 12/2000 | Gura | |
| 6,159,098 | A | 12/2000 | Slomiany et al. | |
| 6,174,235 | B1 | 1/2001 | Walker et al. | |
| 6,190,254 | B1 * | 2/2001 | Bennett | 463/13 |
| 6,203,429 | B1 * | 3/2001 | Demar et al. | 463/20 |
| 6,231,442 | B1 * | 5/2001 | Mayeroff | 463/16 |
| 6,251,013 | B1 * | 6/2001 | Bennett | 463/13 |
| 6,261,177 | B1 * | 7/2001 | Bennett | 463/16 |
| 6,261,178 | B1 * | 7/2001 | Bennett | 463/20 |
| 6,357,749 | B1 | 3/2002 | Feola | |
| 6,364,766 | B1 * | 4/2002 | Anderson et al. | 463/16 |
| 6,386,975 | B1 * | 5/2002 | Peterson | 463/16 |
| 6,413,161 | B1 * | 7/2002 | Baerlocher et al. | 463/20 |
| 6,419,579 | B1 * | 7/2002 | Bennett | 463/20 |
| 6,471,208 | B2 * | 10/2002 | Yoseloff et al. | 273/143 R |
| 6,572,471 | B1 * | 6/2003 | Bennett | 463/16 |
| 6,599,192 | B1 * | 7/2003 | Baerlocher et al. | 463/25 |
| 6,688,977 | B1 * | 2/2004 | Baerlocher et al. | 463/25 |
| 6,776,711 | B1 * | 8/2004 | Baerlocher | 463/16 |
| 6,811,483 | B1 * | 11/2004 | Webb et al. | 463/16 |
| 6,921,334 | B1 * | 7/2005 | Bennett | 463/16 |
| 2001/0048193 | A1 * | 12/2001 | Yoseloff et al. | 273/138.1 |
| 2002/0010016 | A1 * | 1/2002 | Tsukahara | 463/20 |
| 2002/0082074 | A1 * | 6/2002 | Bennett | 463/20 |
| 2003/0073481 | A1 * | 4/2003 | Bennett | 463/20 |
| 2003/0083120 | A1 * | 5/2003 | DeWall et al | 463/16 |

FOREIGN PATENT DOCUMENTS

| | | | |
|---|---|---|---|
| EP | 0945837 | A2 | 9/1999 |
| EP | 0984408 | A2 | 3/2000 |
| EP | 0984409 | A2 | 3/2000 |
| GB | 2144644 | A * | 3/1985 |
| WO | WO 00/12186 | | 3/2000 |

OTHER PUBLICATIONS

Jackpot Party Brochure and Articles published by WMS Gaming, Inc. in 1998.

Addams Family Brochure and Article published by IGT, Strictly Slots in 2000.

Wheel of Fortune Brochure published by IGT in 1999.

Sphinx Brochure published by Atronic Casino Technology, Ltd. in 1997.

Caribbean Gold II published by Aristocrat Incorporated in 1998.

South Park—Dodgeball Brochure published by IGT in 2000.

Take Your Pick Brochure and Article published by IGT/Anchor Games, Strictly Slots in 1999.

Cash Box Brochure & Article published by Anchor Games, Strictly Slots in 2000.

The Official Let's Make a Deal Website published by Bally Gaming System Website printed on Mar. 16, 2001.

Description of Let's Make a Deal Television Show published by letsmakeadeal.com (2 pages) printed on Mar. 16, 2001.

Let's Make a Deal published by geocities.com (2 pages) printed on Mar. 16, 2001.

Let's Make a Deal pubished by geocities.com (10 pages) printed on Mar. 21, 2001.

Let's Make a Deal published by fortunecity.com (4 pages) printed on Mar. 21, 2001.

The Deals of Let's Make a Deal published by fortunecity.com (2 pages) printed on Mar. 16, 2001.

Let's Make a Deal published by Illinoislottery.com (1 page) printed on Mar. 21, 2001.

Let's Make a Deal Game Brochure published by Ball Gaming Systems in 1999.

* cited by examiner

FIG. 8

98

100

| ITEM |
|---|
| APPLE |
| CELL PHONE |
| ORANGE |
| WHISTLE |
| BANANA |
| HARMONICA |
| GRAPES |
| FALSE TEETH |
| LEMON |
| SANDWICH |
| FLASHLIGHT |
| FOOTBALL |
| SUNGLASSES |
| TICKET STUB |

FIG. 9

102

| NUMBER OF ASSIGNMENTS (104) | PROBABILITY (106) |
|---|---|
| 1 | 20% |
| 2 | 25% |
| 3 | 40% |
| 4 | 15% |

FIG. 10

108

| NUMBER OF ASSIGNMENTS (110) | PROBABILITY (112) |
|---|---|
| 1 | 30% |
| 2 | 40% |
| 3 | 20% |
| 4 | 10% |

FIG. 11

114

| NUMBER OF ASSIGNMENTS (116) | PROBABILITY (118) |
|---|---|
| 1 | 50% |
| 2 | 30% |
| 3 | 15% |
| 4 | 5% |

FIG. 12

120

| NUMBER OF ASSIGNMENTS (122) | PROBABILITY (124) |
|---|---|
| 2 | 20% |
| 5 | 20% |
| 10 | 20% |
| 15 | 20% |
| 20 | 20% |

GAMING DEVICE HAVING A MULTI-ROUND BONUS SCHEME WHEREIN EACH ROUND HAS A PROBABILITY OF SUCCESS

REFERENCE TO RELATED APPLICATIONS

This application is related to the following commonly owned co-pending patent applications: "Gaming Device Having A Bonus Round With Multiple Random Award Generation And Multiple Return/Risk Scenarios," Ser. No. 09/678,989, "Gaming Device Having A Method For Randomly Generating A Bonus Round Outcome," Ser. No. 09/679,251, "Gaming Device Having An Indicator Selection With Probability-Based Outcome Bonus Scheme," Ser. No. 09/605,809, "Gaming Device Having A Multiple Selection And Award Distribution Bonus Scheme," Ser. No. 09/688,635,

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a multi-round bonus scheme wherein each round has a predetermined or randomly determined probability of success.

BACKGROUND OF THE INVENTION

Gaming devices currently exist with bonus rounds in which a player has one or more opportunities to choose masked bonus awards from a group of masked awards displayed to the player. When the player chooses a masked award from the group, the game removes the mask and either awards the player with a bonus value or terminates the bonus round with a bonus terminator. The outcome depends upon whether the player selects an award or a terminator.

In the above game, the controller of the gaming device randomly places a predetermined number of masked awards and terminators in the pattern at the beginning of the bonus round and maintains the positioning until the bonus round terminates. When the player selects a masked award, the player receives the value of the award, and the game typically displays a message that the player may continue and enables the player a to select another masked award. The player then selects another masked award, and the process continues until the player selects a masked terminator. European Patent Application No. EP 0 945 837 A2 filed on Mar. 18, 1999 and assigned on its face to WMS Gaming, Inc. discloses a bonus round of this type.

Gaming machines also currently exist with bonus rounds in which the game determines the player's award. PCT Application No. PCT/AU97/00121 entitled, Slot Machine Game with Roaming Wild Card, having a publication date of Sep. 4, 1997, discloses an example. In this application, a slot machine having a video display contains a plurality of rotatable reels with game symbols. When the player receives a triggering symbol or combination, the game produces a bonus symbol. The bonus symbol moves from game symbol to game symbol temporarily changing the game symbol to a bonus symbol. If the change results in a winning combination, the player receives an award.

Known gaming machines also provide bonus rounds in which the game selects symbols that determine the player's award, and the game maintains a minimum winning percentage, whereby the game iteratively and randomly selects symbols producing an award until selecting a losing combination of symbols. European Patent Application No. EP 0 874 337 A1 filed on Mar. 27, 1998 and assigned on its face to WMS Gaming, Inc. discloses a bonus scheme of this type.

The first "go-until" or "do-until" round can end quickly, with no award generation, if the player initially selects a bonus round terminator. In the second bonus round, the game generates awards based upon symbol combinations. If no symbol combination produced in the bonus round yields an award, the player can receive nothing. The third bonus round is a "go-until" or "do-until" round in which the game, rather than the player, selects until selecting a losing combination of symbols. In the second and third games, the level of player interaction is limited to observing events unfold as the game selects or generates the symbols without player input.

In all three bonus games, the player can win nothing from the bonus round. To avoid a situation wherein the bonus game too often yields no awards, the game must set a high winning percentage. If so, then to avoid consistently paying extraordinary awards, a bonus round must be a rare event or award relatively nominal award amounts.

It should be appreciated that certain known bonus schemes limit the flexibility of gaming device manufacturers. In certain bonus rounds, the manufacturer develops a bonus game theme that itself will provide excitement and enjoyment to a player. In these instances, the manufacturer likely desires the bonus round to occur relatively frequently. The manufacturer may wish the normal operation of the bonus round employing the theme to generate an award for the player, rather than a secondary consolation prize. The manufacturer also likely wishes to generate small, medium and large awards without overpaying and making the gaming device unprofitable.

SUMMARY OF THE INVENTION

The present invention provides a gaming device, and more particularly a multi-round bonus scheme of a gaming device wherein each round has a probability of success. In one preferred embodiment, the game provides the player a set or group of symbols or selections in each round. The game associates a variable quantity (i.e., one or more) of an item with one or more of the symbols of the group. The player preferably chooses one symbol from the group of symbols in each round. If the chosen symbol has an associated item, the game awards the player with an award in that round. If the player chooses a symbol which does not have an associated item, the game does not award the player with an award in that round.

The game preferably provides a plurality of rounds, each having a group of symbols. The game can display multiple groups and thus play multiple rounds at once or, preferably, play each round separately, individually and sequentially displaying the groups. The player preferably has an opportunity to select a symbol having an associated item from each group in a round. The game also preferably maintains and associates a different item with the symbols in a round and selects items according to a theme of the gaming device.

As stated above, the game can vary the number of symbols in a round having an associated item. In doing so, the game can vary the percentage of symbols having an associated item and accordingly vary the likelihood of a player succeeding in each round. Providing multiple rounds and thus multiple opportunities for the player to win an award and varying the likelihood of success among the different opportunities provides the implementor the flexibility of providing relatively high and low value bonus awards in one bonus game. The implementor can also guarantee success in a round by associating an item with each symbol of a group and assigning an appropriate prize so that the game does not become unprofitable. Thus, the present invention provides an interactive bonus scheme of a gaming device, wherein the implementor can set the bonus game to frequently occur, to have a wide range of award values and to guarantee a win to the player.

It is therefore an object of the present invention to provide a multi-round bonus scheme of gaming device, wherein each round has a probability of success.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 8 is a table of one embodiment of the present invention including a plurality of different items of the present invention;

FIG. 9 is a table of a preferred embodiment of the present invention including a plurality of different number of assignments, wherein the game randomly assigns an item to one selectable symbol of the present invention;

FIG. 10 is a table of a preferred embodiment of the present invention including a plurality of different number of assignments, wherein the game randomly assigns an item to two selectable symbols of the present invention;

FIG. 11 is a table of a preferred embodiment of the present invention including a plurality of different number of assignments, wherein the game randomly assigns an item to three selectable symbols of the present invention;

FIG. 12 is a table of preferred embodiment of the present invention including a plurality of prize values and an associated probability for each prize value.

DETAILED DESCRIPTION OF THE INVENTION

Gaming Device and Electronics

Figure 1:
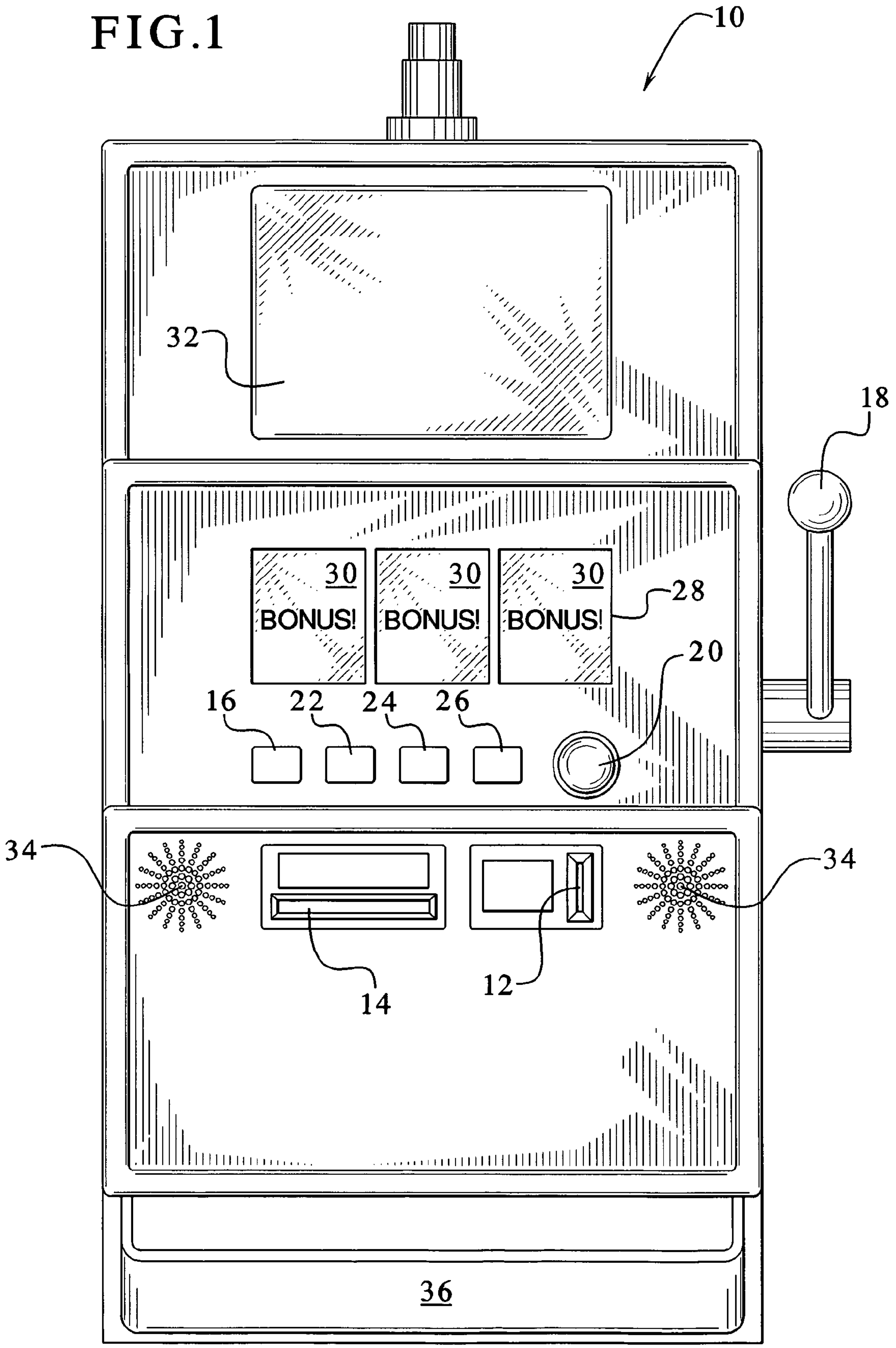
FIG. 1 is a front elevational view of a general embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) that a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform. Gaming device 10 can incorporate any game such as slot, poker or keno. The symbols used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. The present invention preferably employs or uses credits, however, the present invention is not limited to the use of credits and contemplates employing other units of value such as money. For purposes of describing and claiming this invention, the term "credit" includes any unit of value such as a gaming device credit or actual money.

After depositing the appropriate amount of money, a player can begin the game by pulling arm 18 or by pushing play button 20. Play button 20 can be any play activator used by the player which starts any game or sequence of events in the gaming device.

Referring still to FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of symbols such as bells, hearts, martinis, fruits, cactuses, numbers, cigars, letters, bars or other images, which preferably correspond to a theme associated with the gaming device 10. If the reels 30 are in video form, the gaming device 10 preferably displays the video reels 30 in a display device described below. Furthermore, gaming device 10 preferably includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards that keep track of the player's credits.

With respect to electronics, the controller of gaming device 10 preferably includes the electronic configuration generally illustrated in FIG. 2, which has: a processor 38; a memory device 40 for storing program code or other data; a display device 32 (i.e., a liquid crystal display) described below; a plurality of speakers 34; and at least one input device as indicated by block 33. The processor 38 is preferably a microprocessor or microcontroller-based platform that is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code, which controls the gaming device 10 so that it plays a particular game in accordance with applicable game rules and paytables.

Figure 2:
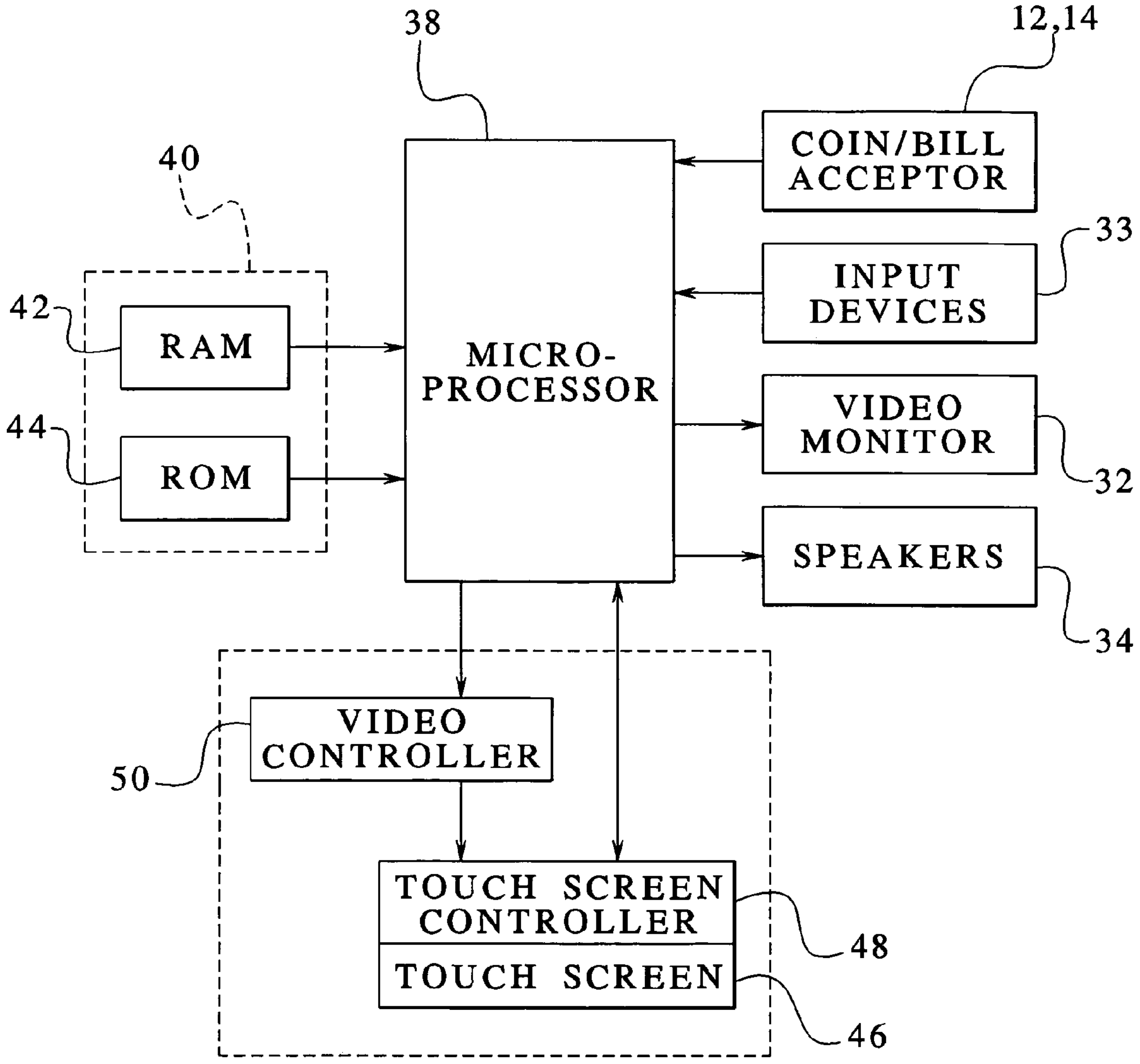
FIG. 2 is a schematic block diagram of the electronic configuration of one embodiment of the gaming device of the present invention.

As illustrated in FIG. 2, the player preferably uses the input devices 33, such as the arm 18, play button 20, the bet one button 24 and the cash out button 26 to input signals into gaming device 10. In certain instances, a touch screen 46 and an associated touch screen controller 48 can be used in conjunction with a display device described in detail below. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. For purposes of describing the invention, the controller includes the processor 38 and memory device 40.

Referring to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, gaming device 10 also preferably gives players the opportunity to win credits in a bonus game. This type of gaming device 10 will include a program that will automatically begin a bonus game when the player has achieved a qualifying condition in the primary or base game. This qualifying condition can be a particular arrangement of indicia on the display window 28. The gaming device 10 also includes a display device such as a display device 32 shown in FIG. 1 enabling the player to play the bonus game. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Selectable Symbol Configuration

Figure 3A:
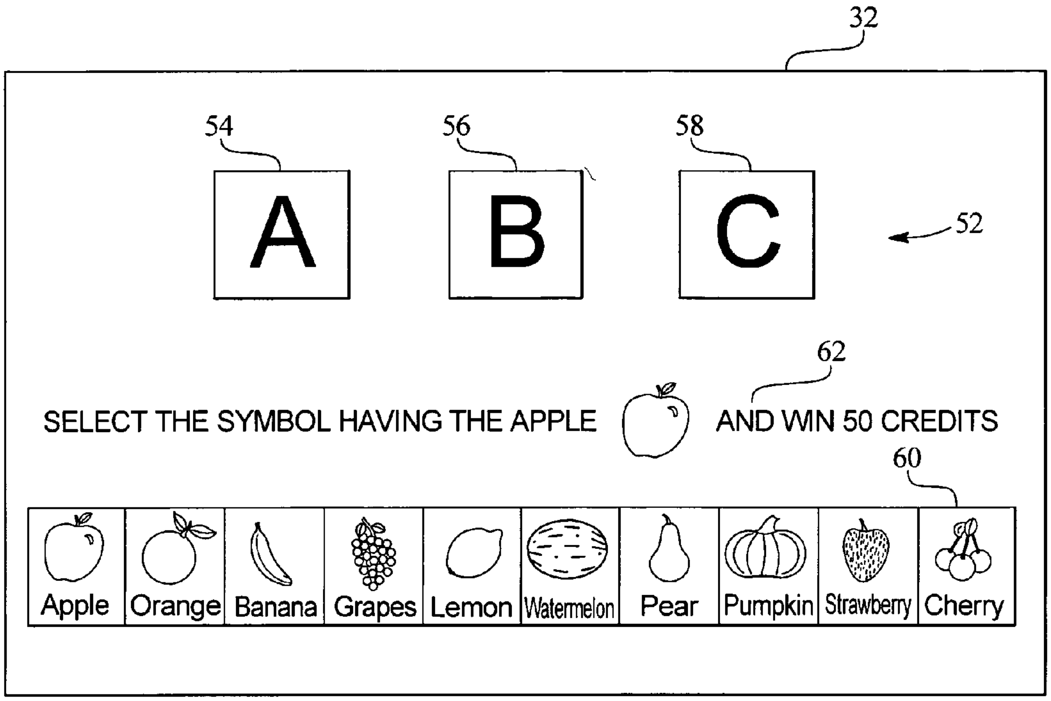
FIG. 3A is an enlarged front elevational view of the display device illustrating one embodiment of the present invention, which has a group of selectable symbols.

Referring now to FIG. 3A, an enlarged front elevational view of the display device 32 illustrates one embodiment of the present invention, which includes a group 52 of selectable symbols and an associated item of a round. The game displays the group 52 of symbols "A", "B" and "C". As mentioned above, the display device 32 preferably includes a touch screen 46 and an associated touch screen controller 48 (FIG. 2). Each of the symbols "A", "B" and "C" is thus preferably a player selectable area or selector 54, 56 and 58, respectively, on the display device 32. Each selector sends a unique input signal to the controller of the present invention when selected or chosen by the player. Each symbol preferably has an exclusive selector, as shown. The game preferably maintains and displays three symbols and selectors for repeated use in each round, however, the game can maintain and display any number (greater than one) desired by the implementor of the gaming device.

The embodiment of FIG. 3A can maintain and display a row of items 60. The game alternatively does not have to display any items and can otherwise function without such a display. Displaying the row 60 will aid in the description of the present invention and is therefore included. The row includes fruits, however, the implementor can include any items, which may or may not be related to each other, such as a sandwich, cell phone, whistle, harmonica, false teeth, flashlight, football, sunglasses and ticket stub. The items could also be numbers, letters, characters or any images. The game can instead or in addition to the row of items 60 provide a suitable prompt 62. The prompt 62 generally asks the player to select the symbol having one of the items from the row 60. The prompt 62 preferably discloses which item to associate with a symbol, e.g., the apple. The prompt also preferably discloses the potential prize value, e.g., 50 credits. The prompt 62 is illustrated as a visual, textual prompt. The game can also provide a similar audio prompt in place of or in addition to the visual prompt.

Figure 3B:
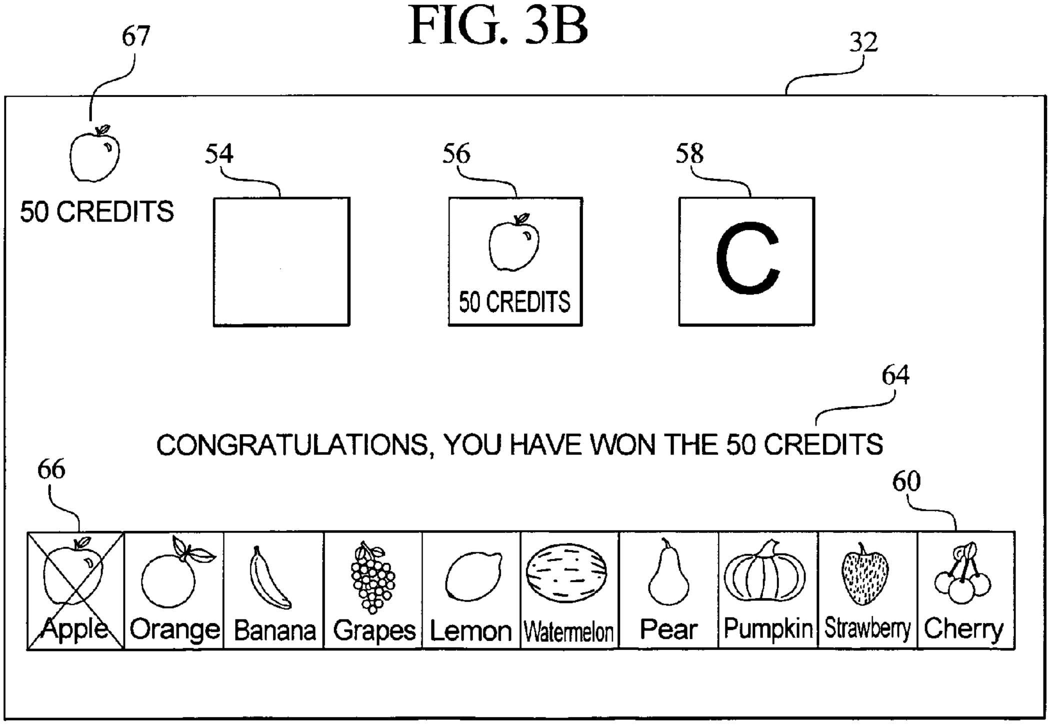
FIG. 3B is an enlarged front elevational view of the display device illustrating the embodiment of FIG. 3A after the player's selection, wherein the game has revealed the location of an award producing item.

Referring now to FIG. 3B, an enlarged front elevational view of the display device 32 illustrates the embodiment of FIG. 3A, wherein the game has revealed the location of the item after the player's selection. In this example, the player selected the "B" symbol of FIG. 3A, which is the symbol that the game associated or assigned the item (apple) to. The player therefore obtained the 50 credits, as illustrated by the message 64. The message 64 is illustrated as a visual, textual message. The game can also provide a similar audio message in place of or in addition to the visual message. If the player did not choose the correct symbol, the message 64 would change accordingly.

The present invention contemplates any type of award or prize such as the gaming device credits, as illustrated, gaming device multipliers, or any other desired award or prize. The display device can include a suitable meter (not shown), which accumulates awards or prizes obtained during the bonus round. Alternatively, the game can simply update the credit display 16. After revealing, the game can continue to display the row of items 60 and can further suitably mark a "spent" or previously played item, as indicated by the "X" through the apple item 66. The game also preferably displays and accumulates the items and their associated credits, which the player has successfully selected in a separate area 67 of the display device 32.

FIG. 3B illustrates certain aspects of the reveal feature of the present invention. When the player successfully chooses a symbol having an associated item, as in FIGS. 3A and 3B, the game preferably displays the item and can also display the item's associated award or prize on or around the area of the item, as indicated by the selector 56. The game can also reveal the symbols that do not have an associated item, as indicated by the blank space inside the selector 54. Alternatively, the game can not reveal the symbols that do not have an associated item, as indicated by the "C" symbol inside the selector 58. Further alternatively, the game can display the item and associated award or prize near its associated symbol (not shown) and thereby not disrupt any of the symbols.

Figure 4:
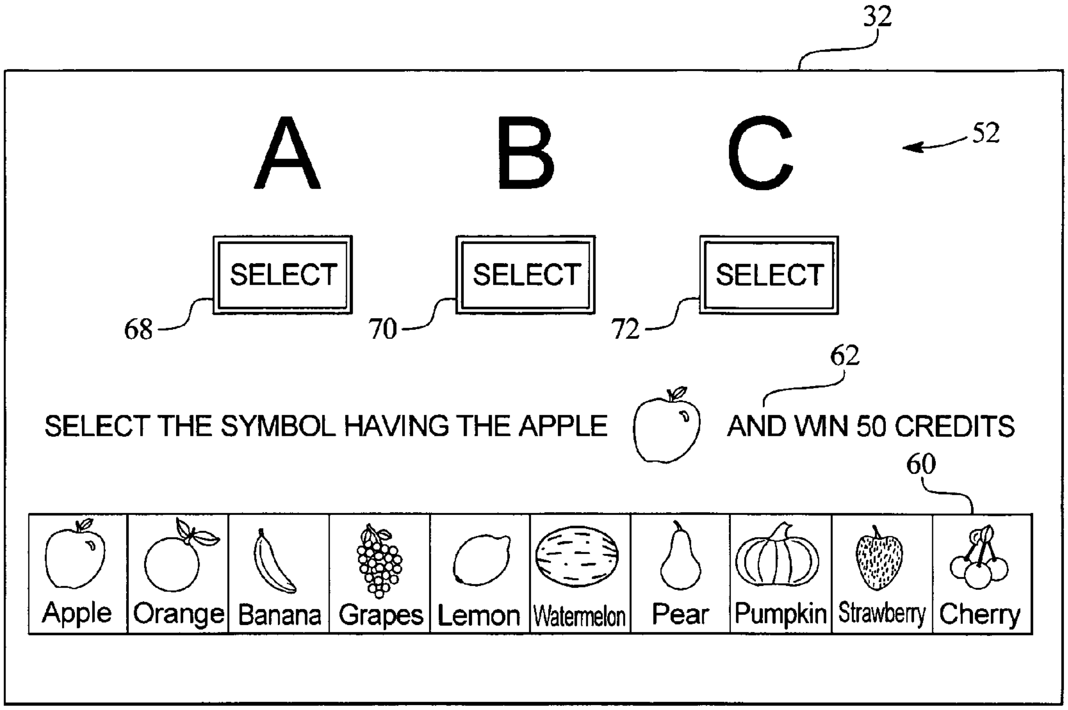
FIG. 4 is an enlarged front elevational view of the display device illustrating another embodiment of the present invention, which has a group of symbols and a separate group of associated selectors on the display device.

Referring now to FIG. 4, an enlarged front elevational view of the display device 32 illustrates another embodiment of the present invention, wherein the selectors are separate but juxtaposed to an associated symbol. In this embodiment, the game can display the row of items 60 and preferably provides the visual prompt 62. In FIG. 4, the game displays the row of symbols 52 including the "A", "B" and "C" symbols separately from their respective selectors 68, 70 and 72. The selectors are still separate areas of a touch screen 46 and can contain suitable prompting indicia such as "select." The game preferably positions the selectors so that the player easily associates a selector to its respective symbol as illustrated. The reveal feature in this embodiment preferably replaces a symbol "A", "B" or "C" and otherwise does not disrupt any of the selectors.

Figure 5:
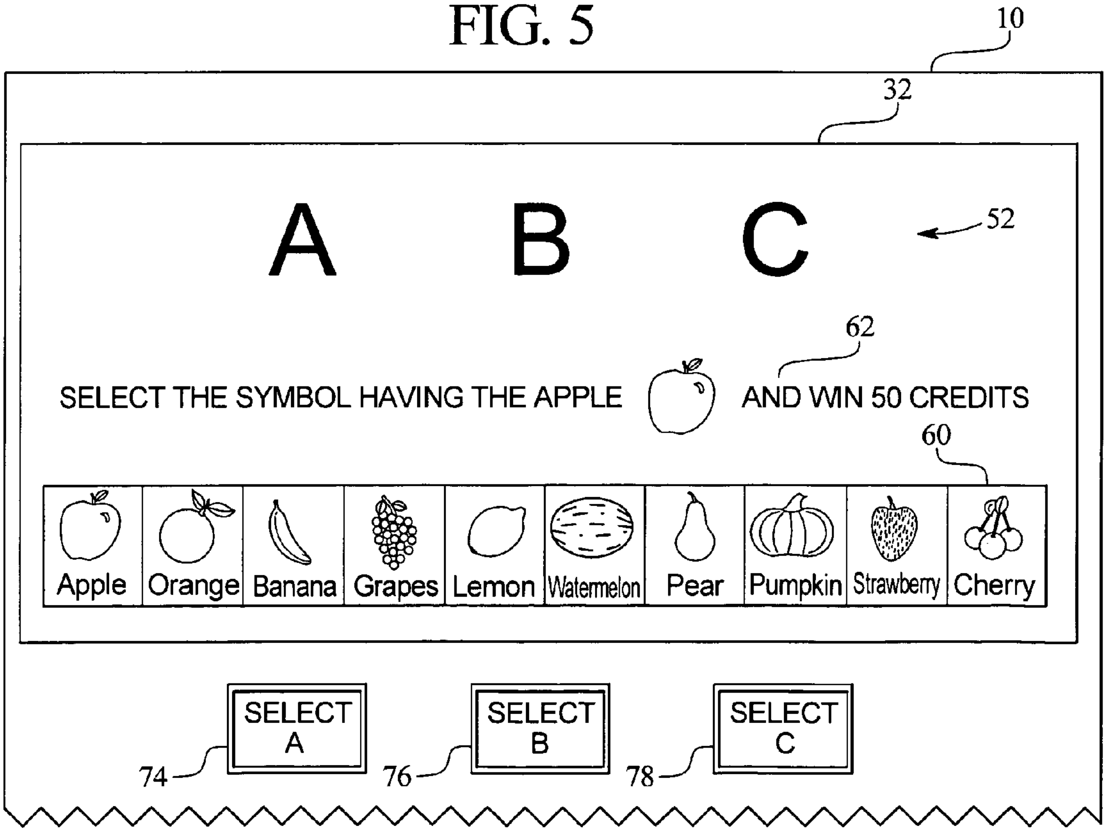
FIG. 5 is an enlarged front elevational view of the gaming device illustrating a further embodiment of the present invention, which has a group of symbols on a display and a group of associated electro-mechanical selectors mounted to the gaming device.

Referring now to FIG. 5, an enlarged front elevational view of the gaming device 10 illustrates a further embodiment of the present invention, wherein the selectors are electro-mechanical and mounted to the front panel of the gaming device 10. In this embodiment, the game can display the row of items 60 and preferably provides the visual prompt 62. A separate front panel mountable input device 33 (FIG. 2), which is well known in the art, can enable a player to choose one of the symbols "A", "B" or "C". This embodiment preferably includes a separate electro-mechanical selector 74, 76 and 78 for each symbol "A", "B" and "C", respectively. The position of the selectors does not readily associate the selectors to their respective symbols, so each contains a suitable message such as, "select A". The reveal feature of this embodiment operates in substantially the same manner as in the embodiment of FIG. 4.

Figure 6:
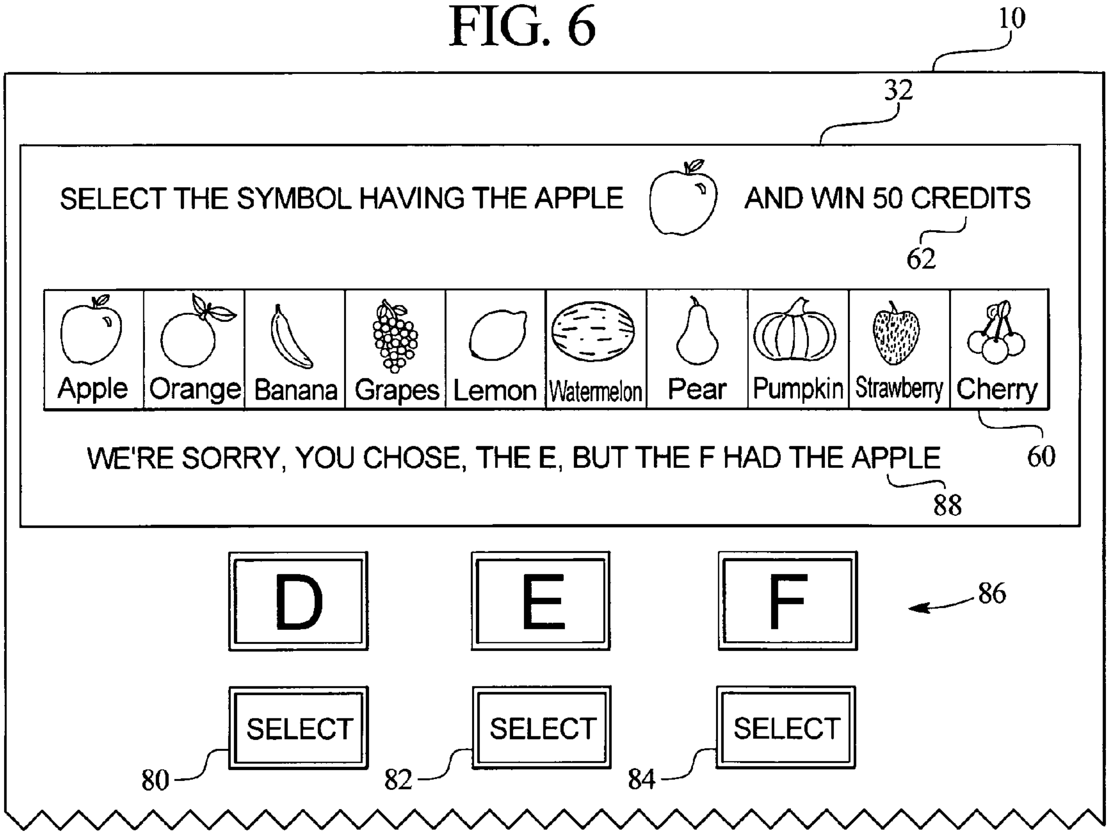
FIG. 6 is an enlarged front elevational view of the gaming device illustrating yet another embodiment of the present invention, which includes a group of electro-mechanical symbols and a group of associated electro-mechanical selectors mounted to the gaming device.

Referring now to FIG. 6, an enlarged front elevational view of the gaming device 10 illustrates yet another embodiment of the present invention, wherein the selectors and the symbols are both electro-mechanical and mounted to the front panel of the gaming device 10. A separate front panel mountable input device 33 (FIG. 2), which is well known in the art, can enable a player to choose one of the symbols "D", "E" or "F". The game preferably includes a separate electro-mechanical selector 80, 82 and 84 for each symbol "D", "E" and "F" of the row 86, respectively, which are each preferably lightable indicators. The game preferably positions the selectors so that the player easily associates a selector to its respective symbol as illustrated and can provide a suitable prompt such as, "select." A separate display device 32 can display the row of items 60 and preferably provides the visual prompt 62. A touch screen 46 is not necessary in this embodiment. The reveal feature can light the indicator having the associated item and in addition provide a suitable visual or audio message 88 on the display device, such as, "we're sorry, you chose the 'E', but the 'F' had the apple." In this example, the game does not display the item and its associated credits in the separate prize accumulation area because the player did not successfully select the item.

Figure 7:
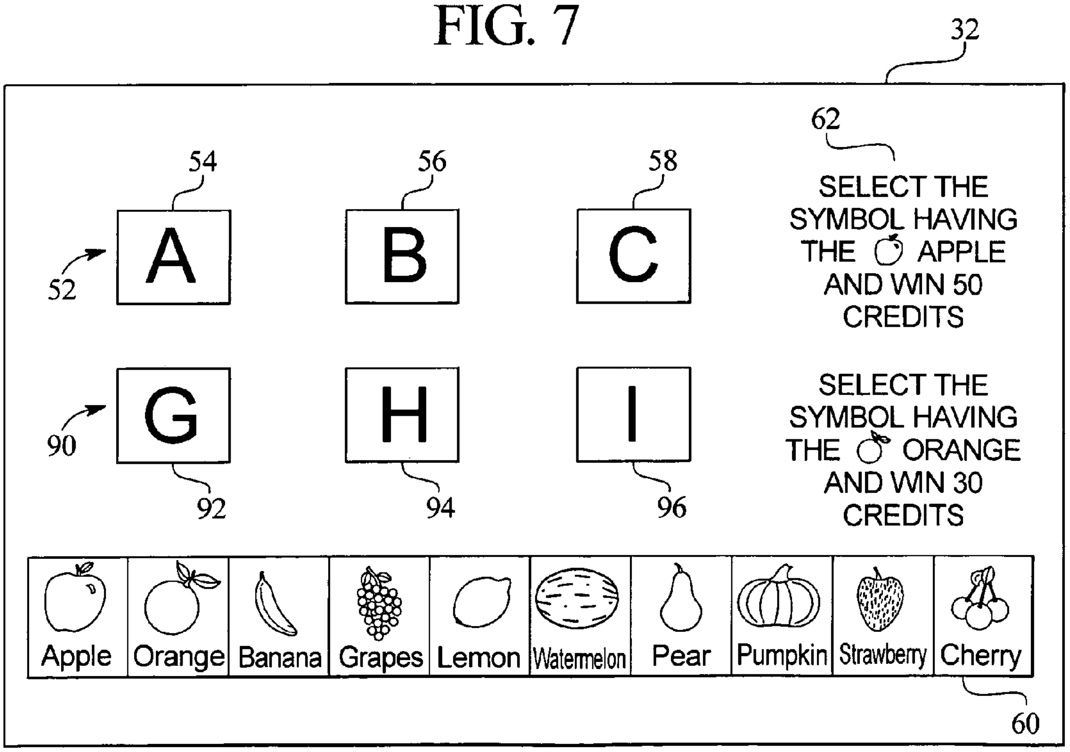
FIG. 7 is an enlarged front elevational view of the display device illustrating yet a further embodiment of the present invention, which includes a plurality of groups of selectable symbols.

Referring now to FIG. 7, an enlarged front elevational view of the display device 32 displaying yet a further embodiment of the present invention is illustrated, which includes a plurality of groups of selectable symbols. Each of the symbols "A", "B" and "C" of the group 52 is also a player selectable area or selector 54, 56 and 58, respectively, as discussed with FIG. 3A. Likewise, each of the symbols "G", "H" and "I" of the group 90 is also a player selectable area or selector 92, 94 and 96, respectively, on the display device 32. It should be appreciated that the multiple groups can be presented in combination with any of the embodiments of FIG. 3A, 4, 5 or 6.

The embodiment of FIG. 7 illustrates that the game can provide multiple groups, wherein each group presents the player with a separate opportunity to win an award. The game can provide any number of groups and is not limited to the two groups illustrated in FIG. 7. The game can make selecting from a subsequent group, e.g., group 90 in one round contingent on the result of selecting from a previous group, e.g., group 52 in a previous round. The contingency can be based upon any outcome of the present invention, such as selecting a symbol having an associated item, selecting a symbol not having an associated item or winning a prize above or below a predetermined value. The game can thus display multiple groups at one time, as illustrated here in FIG. 7. As discussed below, the game can alternatively sequentially display multiple groups, at different times, and on separate screens of the display device 32.

The present invention preferably maintains the same group of symbols throughout the round, such as symbols "A", "B" and "C" of FIGS. 3A, 3B, 4 and 5. The present invention can also employ one or more different groups of symbols, as illustrated above in FIG. 7, or a combination of new and old symbols. The associated symbols can be any symbols and are not limited to the "A", "B" and "C" of FIGS. 3A, 3B, 4 and 5.

The game preferably separately displays a separate "apple" sequence, "orange" sequence, "banana" sequence, etc. on the display device 32, each of which provide the player with an opportunity to win the associated prize by guessing which symbol has the item. In an alternative embodiment, the present invention can display all the symbol groups on display device 32 at once, as illustrated in FIG. 7, each of which can provide the player with an opportunity to win the associated prize by guessing which symbol has the item. In any embodiment, the game preferably randomly associates the item with one of the symbols "A", "B" or "C". That is, if the game predetermined which symbol had the item, players would soon learn the configuration of the present invention.

Databases of the Present Invention

Referring now to FIG. 8, one embodiment of a schematic table 98 displaying a plurality of different items 100 of the present invention is illustrated. The items 100 of FIG. 8 comprise some of the fruits previously disclosed as well as other non-related items; namely, an apple, a cell phone, an orange, a whistle, a banana, a harmonica, grapes, false teeth, a lemon, a sandwich, a flashlight, a football, sunglasses and a ticket stub. The items can be any symbol or thing desired by the implementor and can be related to other items or not. The game preferably randomly selects one of the items 100 from the table 98 to associate with one of the selectable symbols, such as symbols "A", "B" and "C" of FIGS. 3A, 3B, 4 and 5. In one embodiment, the game does not pick one item twice in any one round. Alternatively, the game can assign weights to one or more of the items, so that the game selects some items more often than others. Further alternatively, the implementor can set one or more predetermined order of items.

Referring now to FIG. 9, a preferred embodiment is illustrated in table 102 which includes a plurality of different number of assignments 104, wherein the game randomly assigns an item to one selectable symbol. The table 102 illustrates that the present invention can assign an item to one selectable symbol up to four times. That is, the game, according to the table 102, can provide up to four opportunities to the player in which the game assigns an item to one of the symbols. In the preferred embodiment, wherein the game includes three symbols, table 102 provides the player with up to four chances having a 33% success probability in each round. It should be appreciated that the game can include any number of assignment 104 entries in the table 102, and is not limited to entries one through four, as illustrated, and is not limited to including sequential or incrementing entries.

The game preferably assigns or attaches a weight or probability 106 to each number of assignments 104 of the table 102. The weight or probability 106 may be stored as a percentage, as illustrated, however the present invention can designate the weight or probability 106 as odds, a fraction or via any suitable means. The probabilities 106 of the table 102 preferably add up to 100%. The probabilities determine the likelihood of the game randomly generating a particular number of assignments 104 of the table 102.

In table 102, the implementor has predetermined that: (i) in 20% of the games of the present invention, the game will randomly assign an item to one of the symbols only once; (ii) in 25% of the games of the present invention, the game will randomly assign an item to one of the symbols twice; (iii) in 40% of the games of the present invention, the game will randomly assign an item to one of the symbols three times; and (iv) in 15% of the games of the present invention, the game will randomly assign an item to one of the symbols the maximum of four times. The implementor can provide any weighting or probability distribution that satisfies the game math, including a distribution wherein each number of assignments 104 is weighted equally and has an equal chance of being selected.

Referring now to FIG. 10, a preferred embodiment of a schematic table 108 includes a plurality of different number of assignments 110, wherein the game randomly assigns an item to two selectable symbols of the present invention. The table 108 illustrates that the present invention can assign an item to two selectable symbols up to four times. That is, the game, according to the table 108, can provide up to four opportunities to the player in which the game assigns an item to two of the symbols. In the preferred embodiment, wherein the game includes three symbols, table 108 provides the player with up to four chances having a 67% success probability in each round. It should be appreciated that the game can include any number of assignment 104 entries in the table 108, is not limited to entries one through four, as illustrated, and is not limited to including sequential or incrementing entries.

The game again preferably assigns or attaches a weight or probability 112 to each number of assignments 110 of the table 108. The weight or probability 112 may be stored as a percentage, as illustrated, however the present invention can designate the weight or probability 112 as odds, a fraction or via any suitable means. The probabilities 112 of the table 108 preferably add up to 100%. The probabilities determine the likelihood of the game randomly generating a particular number of assignments 110 of the table 108.

In table 108, the implementor has predetermined that: (i) in 30% of the games of the present invention, the game will randomly assign an item to two of the symbols only once; (ii) in 40% of the games of the present invention, the game will randomly assign an item to two of the symbols twice; (iii) in 20% of the games of the present invention, the game will randomly assign an item to two of the symbols three times; and (iv) in 10% of the games of the present invention, the game will randomly assign an item to two of the symbols the maximum of four times. The implementor can again provide any weighting or probability distribution that satisfies the game math, including a distribution wherein each number of assignments 110 is weighted equally and has an equal chance of being selected.

Referring now to FIG. 11, a preferred embodiment of a schematic table 114 includes a plurality of different number of assignments 116, wherein the game randomly assigns an item to three selectable symbols of the present invention. In this embodiment, three symbols having an assigned item will guarantee a successful outcome for these assignments. The table 114 illustrates that the present invention can assign an item to three selectable symbols up to four times. That is, the game, according to the table 114, can provide up to four opportunities to the player in which the game assigns an item to three of the symbols. In the preferred embodiment, wherein the game includes three symbols, table 114 provides the player with up to four chances in which the player cannot lose. The game guarantees a win by providing a 100% success probability in at least one round. It should be appreciated that the game can include any number of assignment 116 entries in the table 114, is not limited to entries one through four, as illustrated, and is not limited to including sequential or incrementing entries.

The game yet again preferably assigns or attaches a weight or probability 118 to each number of assignments 116 of the table 114. The weight or probability 118 may be stored as a percentage, as illustrated, however the present invention can designate the weight or probability 118 as odds, a fraction or via any suitable means. The probabilities 118 of the table 114 preferably add up to 100%. The probabilities determine the likelihood of the game randomly generating a particular number of assignments 116 of the table 114.

In table 114, the implementor has predetermined that: (i) in 50% of the games of the present invention, the game will randomly assign an item to three of the symbols only once; (ii) in 40% of the games of the present invention, the game will randomly assign an item to three of the symbols twice; (iii) in 20% of the games of the present invention, the game will randomly assign an item to three of the symbols three times; and (iv) in 10% of the games of the present invention, the game will randomly assign an item to three of the symbols the maximum of four times. The implementor can again provide any weighting or probability distribution that satisfies the game math, including a distribution wherein each number of assignments 116 is weighted equally and has an equal chance of being selected.

It should be appreciated that the number of selectable symbols limits the number of tables, such as tables 102, 108 and 114 of the present invention. In a preferred embodiment providing three selectable symbols such as "A", "B" and "C", the game can only include up to three tables, i.e., one assigning an item to one symbol, one assigning an item to two symbols and one assigning items to all three symbols. In an embodiment including four, five, six selectable symbols, etc., the game can include up to four, five or six tables, etc.

In combination, the tables 102, 108 and 114 create a game, wherein at best, the player has twelve opportunities to select which symbol has the associated prize yielding item, wherein four selections are guaranteed wins. At worst, the player has three opportunities to select which symbol has the associated prize yielding item, one of which is a guaranteed win. Of course, the player's ability to successfully select symbols having an associated item also contributes to the player's overall award.

Referring now to FIG. 12, an award or prize table 120 includes a plurality of award or prize values 122 and an associated weight or probability 124 for each award or prize value. The prize values 122 can be any values desired by the implementor that satisfy the game math. As stated above, the prizes 122 can be game credits, credit multipliers, etc., or any desired type of prize. The weight or probability 124 may be stored as a percentage, as illustrated, however the present invention can designate the weight or probability 124 as odds, a fraction or via any suitable means. The probabilities 124 of the table 114 preferably add up to 100%. The probabilities determine the likelihood of the game randomly assigning a particular prize 122.

In similarity to the random selection of the items, the game preferably assigns the same prize value 122 more than once. In other embodiments, it can be designed to exclude these duplications. As illustrated in FIG. 12, the game preferably assigns an equal percentage 124 or likelihood to each of the prizes 122, so that each has an equal chance of being selected. The implementor can again provide any weighting or probability distribution that satisfies the game math. The implementor can also include any desired number of prizes 122. The present invention contemplates randomly assigning one of the prizes 122 at any time before providing and displaying the prize to the player. The game can also assign a prize 122 to each opportunity, i.e., symbol selection, or assign a prize only after the player successfully selects a symbol having an associated item. That is, assigning a prize does not necessarily equate to awarding the prize to a player. Assigning a prize can alternatively include designating the prize the player receives if the player selects the award yielding symbol. One skilled in the art of game design can structure the award distribution of the present invention in a plurality of ways.

Figure 13:
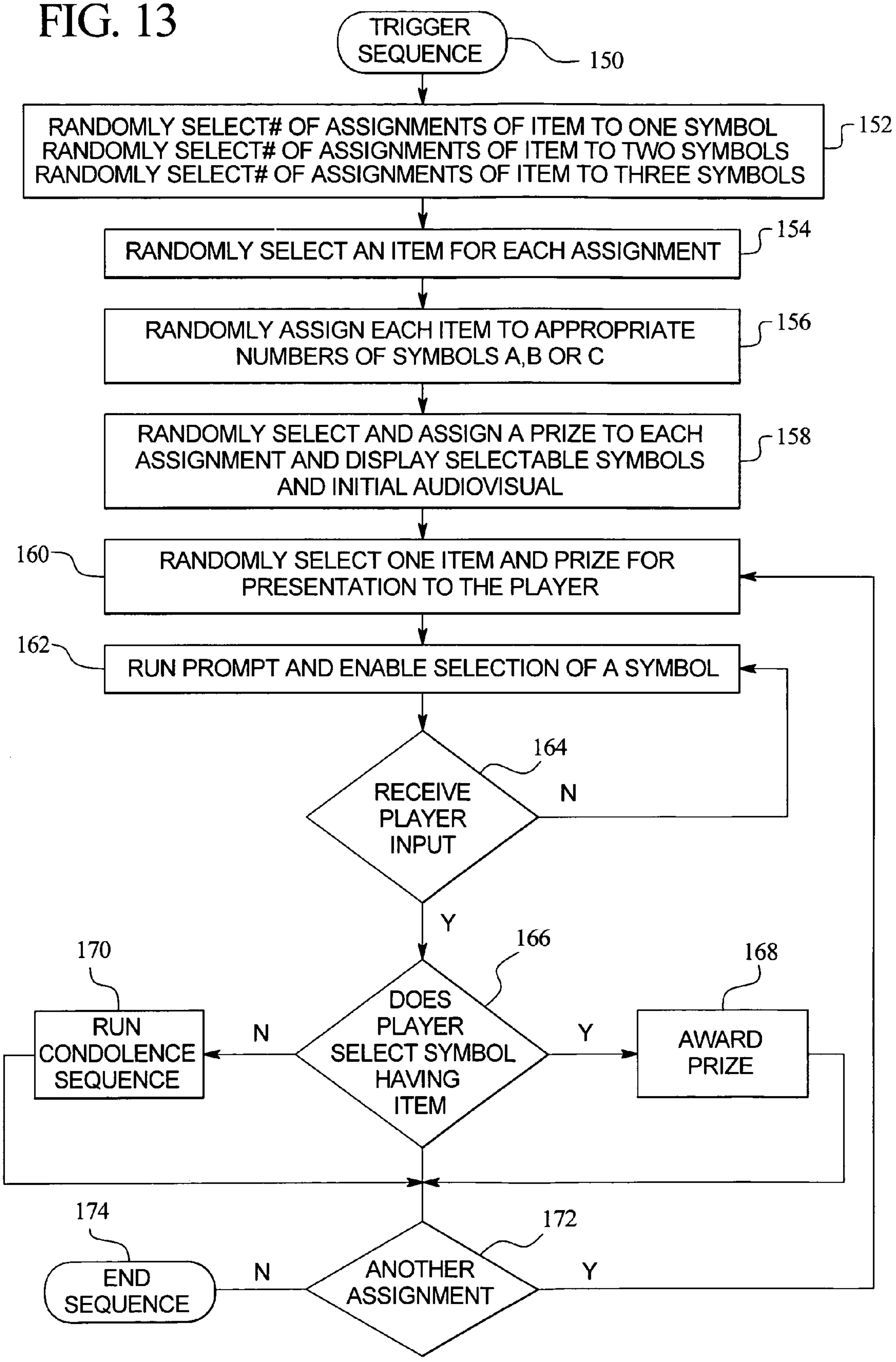
FIG. 13 is a flow diagram of one embodiment of a method of the present invention.

Referring now to FIG. 13, one embodiment of a method flow diagram of the present invention is illustrated. It should be appreciated that from the foregoing disclosure one skilled in the art of game design can develop alternative method flow schemes that employ the previously disclosed data tables. The following disclosure is not intended to limit the invention to the specific method hereafter disclosed.

Upon a sequence triggering event, as indicated by the oval 150, the game of the present invention: (i) randomly selects a number of assignments, wherein the game assigns an item to one symbol; (ii) randomly selects a number of assignments, wherein the game assigns an item to two symbols; and (iii) randomly selects a number of assignments, wherein the game assigns an item to three symbols, as indicated by the block 152. The game then randomly selects an item for each assignment, as indicated by the block 154. As stated above, the game is preferably adapted such that it must randomly select a different item for each assignment.

The game randomly assigns each selected item to the appropriate number of symbols, such as to the appropriate number of symbols "A", "B", and "C" of FIGS. 3A, 3B, 4 and 5, as indicated by the block 156. The game randomly selects and assigns a prize to each assignment or selection opportunity and displays the selectable symbols to the player along with an initial audiovisual production, as indicated by the block 158. As stated above, the game is preferably adapted such that it can select the same prize for a plurality of assignments.

At this point in the sequence, the game knows the total number of assignments as well as the total number of each type of assignment, i.e., whether one, two or three symbols has an item. The game knows the item with which to prompt the player, which selectable symbols yield a win and the prize for a win. The game has also initiated the game by presenting the selectable symbols and explaining the game to the player.

The game randomly selects one item and prize for presentation to the player, as indicated by the block 160. The game runs an appropriate audiovisual prompt disclosing the item and preferably its assigned prize and enables the player to select one of the displayed symbols, as indicated by the block 162. The game awaits an input or decision by the player, as indicated by the diamond 164.

If the player does not input a decision, as indicated by a negative response to the query of diamond 164, the game continues to prompt and enable the player to select a symbol, as indicated by the block 162. The logic loop continues until the player inputs a decision, as indicated by a positive response to the query of diamond 164, after which the game determines if the selected symbol has an associated or assigned item, as indicated by diamond 166.

If the player does not select an award yielding symbol, as indicated by a negative response to the query of diamond 166, the game preferably runs a condolence audio, visual or audiovisual sequence, as indicated by the block 170. If the player does select an award yielding symbol, as indicated by a positive response to the query of diamond 166, the game preferably awards the assigned prize, as indicated by the block 168.

Regardless of the outcome of the player's selection, the game determines if another assignment or selection opportunity exists, as indicated by diamond 172. If no other assignment exists, as indicated by a negative response to the query of the diamond 172, the sequence ends, as indicated by the oval 174. If another assignment does exist, as indicated by a positive response to the query of the diamond 172, the game randomly selects another item and prize for presentation to the player, as indicated by the block 160.

Reveal Feature for Varying Winning Percentages

The bonus round configuration embodiments of FIGS. 3A, 3B, 4, 5, 6 and 7 discussed the reveal feature of the present invention. In general, after the player's selection, the game revealed which symbol had the associated item, via any suitable form of symbol indication. The game revealed the associated symbol regardless of whether the player chose the symbol. The embodiments of FIGS. 3A, 3B, 4, 5, 6 and 7 all included one associated item per symbol group.

When the present invention assigns an item to more than one selectable symbol such as with tables 108 and 114 of FIGS. 9 and 10, respectively, the present invention preferably follows two rules in revealing associated symbols. First, if the present invention assigns an item to more than one selectable symbol, and the player successfully selects one of the associated symbols, the game preferably only reveals that the player selected symbol had an associated item and not any of the other associated symbols. To increase enjoyment, the game preferably lets the player believe the player has been lucky. Second, if the present invention assigns an item to more than one selectable symbol, but the player unsuccessfully selects one of the unassociated symbols, the game preferably reveals all the symbols having the associated item. To increase excitement, the game preferably shows the player a missed opportunity.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device comprising:

at least one display device operable to display a game resulting from a wager, said game including a plurality of displayed symbols;

at least one input device;

and a controller configured to operate with the at least one display device and the at least one input device for a single play of the game:

(a) to randomly determine a first quantity of independent rounds and randomly assign at least one of a plurality of items to one of the plurality of displayed symbols for each of the determined first quantity of independent rounds, wherein said first quantity is at least one, (b) to randomly determine a second quantity of independent rounds and randomly assign at least one of the plurality of items to a plurality of the displayed symbols for each of the determined second quantity of independent rounds, wherein said second quantity is at least one, (c) to randomly determine a third quantity of independent rounds and randomly assign at least one of the plurality of items to all of the displayed symbols for each of the determined third quantity of independent rounds, wherein said third quantity is at least one and said random assignment for each round is independent of said other rounds, (d) to enable the player to select one of the displayed symbols in each of the determined quantities of independent rounds, and (e) to provide an award to the player for each of said determined quantities of independent rounds if said player selects one of the displayed symbols having at least one of said assigned items in said independent round.

2. The gaming device of claim 1, wherein said controller operates with a table of randomly selectable items.

3. The gaming device of claim 1, wherein said controller operates with a table of randomly selectable items, and wherein at least one item is adapted to be randomly selected more often than at least one other item.

4. The gaming device of claim 1, which includes a table of numbers that designate how many rounds the player has in which to select from the plurality of symbols when said item is assigned to a percentage of symbols of said group.

5. The gaming device of claim 4, wherein at least one number of said table is adapted to be randomly selected more often than at least one other number of said table.

6. The gaming device of claim 4, which includes a plurality of tables of numbers.

7. The gaming device of claim 6, wherein at least one number of each table is adapted to be randomly selected more often than at least one other number of said table.

8. The gaming device of claim 4, which includes a quantity of tables of numbers equaling the quantity of symbols in a round.

9. The gaming device of claim 8, wherein at least one number of a table is adapted to be randomly selected more often than at least one other number of said table.

10. The gaming device of claim 1, which includes a table of randomly selectable prizes.

11. The gaming device of claim 1, which includes a table of randomly selectable prizes, and wherein at least one prize is adapted to be randomly selected more often than at least one other prize.

12. A method for operating a gaming device, for a single play of a game resulting from a wager said method comprising:

(a) displaying a plurality of symbols on a display device of said gaming device;

(b) randomly determining a first quantity of independent rounds and randomly assigning at least one of a plurality of items to of said displayed symbols for each of the determined first quantity of independent rounds, wherein said first quantity is at least one;

(c) randomly determining a second quantity of independent rounds and randomly assigning at least one of the plurality of items to a plurality of the displayed symbols for each of the determined second quantity of independent rounds, wherein said second quantity is at least one;

(d) randomly determining a third quantity of independent rounds and randomly assigning at least one of the plurality of items to all of the displayed symbols for each of the determined third quantity of independent rounds, wherein said third quantity is at least one and said random assignment for each round is independent of said other rounds;

(e) selecting a prize for one of the independent rounds;

(f) enabling a player to select one of said displayed symbols for said independent round;

(g) providing said prize to said player if said player chooses said symbol having at least one of said assigned items for said independent round; and (h) repeating steps (e) to (h) for each of the determined quantities of independent rounds in the single play of the game.

13. The method of claim 12, which includes the step of revealing that the symbol has been assigned said item when said player selects said symbol having said assigned item.

14. The method of claim 12, which includes the step of revealing all of the symbols that were assigned said item when said player selects one of the symbols that was not assigned said item.

15. A method for operating a gaming device, for a single play of a game resulting from a wager said method comprising:

(a) displaying a group of symbols on a display device of said gaming device;

(b) randomly determining a first quantity of independent rounds and randomly assigning at least one of a plurality of items to one of the displayed symbols of said group for each of the determined first quantity of independent rounds, wherein said first quantity is at least one;

(c) randomly determining a second quantity of independent rounds and randomly assigning at least one of the plurality of items to a plurality of the displayed symbols of said group for each of the determined second quantity of independent rounds, wherein said second quantity is at least one;

(d) randomly determining a third quantity of independent rounds and randomly assigning at least one of the plurality of items to all of the displayed symbols of said group for each of the determined third quantity of independent rounds, wherein said third quantity is at least one and said random assignment for each round is independent of said other rounds;

(e) enabling the player to select one of the displayed symbols of said group in each of the determined quantities of independent rounds, and (f) providing an award to the player for each of said determined quantities of independent rounds if said player selects one of the displayed symbols having at least one of said assigned items in said independent round.

16. The method of claim 15, which includes the step of selecting a prize.

17. The method of claim 15, which includes the step providing said prize to said player if said player chooses a symbol having said assigned item.

18. The method of claim 15, which includes the step of revealing that a symbol has an assigned item when said player selects a symbol having said assigned item.

19. The method of claim 15, which includes the step of revealing that all symbols having an assigned item indeed have said assigned item when said player selects a symbol not having an assigned item.

20. A method for operating a gaming device, said method comprising the steps of:

(a) displaying a group of symbols on a display device of said gaming device;

(b) assigning a first item to a first percentage of symbols of said group;

(c) assigning a second item to a second percentage of symbols of said group;

(d) selecting a first number of player selections of said first item;

(e) selecting a second number of player selections of said second item;

(f) adding said first number and said second number; and (g) enabling said player to select said added number of times.

21. The method of claim 20, which includes the step of selecting a prize.

22. The method of claim 21, which includes the step providing said prize to said player if said player chooses a symbol having an assigned item.

23. The method of claim 20, which includes the step of revealing that a symbol has an assigned item when said player selects a symbol having said assigned item.

24. The method of claim 20, which includes the step of revealing that all symbols having an assigned item indeed have said assigned item when said player selects a symbol not having an assigned item.

25. A gaming device comprising:

a group of symbols;

a plurality of items;

a display device; and a processor operable with the display device to display said group of symbols, assign one of said items to a first percentage of symbols of said group, assign another one of said items to a second percentage of symbols of said group, select a first number of player selections of said first item, select a second number of player selections of said second item, add the first selected number and the second selected number and enable a player to select from said symbols the added number of times.

26. The gaming device of claim 25, wherein said processor is operable to select a prize.

27. The gaming device of claim 26, wherein said processor is operable to provide the prize to the player if at least one of the player selected symbols is assigned at least one of said items.

28. The gaming device of claim 25, wherein said processor is operable to reveal that one of said player selected symbols is assigned one of said items.

29. The gaming device of claim 25, wherein said processor is operable to reveal that all of said symbols having assigned items indeed have assigned items when the player selected symbol is not assigned to one of said items.

* * * * *